United States Patent [19]

Hancock et al.

[11] Patent Number: 5,758,506
[45] Date of Patent: Jun. 2, 1998

[54] METHOD AND APPARATUS FOR SERVICING AUTOMOTIVE REFRIGERATION SYSTEMS

[75] Inventors: John P. Hancock, Fishers; Jack L. Lawson; James D. Miller, both of Indianapolis, all of Ind.

[73] Assignee: White Industries, LLC, Indianapolis, Ind.

[21] Appl. No.: 675,043

[22] Filed: Jul. 3, 1996

[51] Int. Cl.$^6$ .................................................. F25B 45/00
[52] U.S. Cl. .................................. 62/77; 62/149; 62/292
[58] Field of Search .................................. 62/77, 85, 126, 62/125, 149, 292

[56] References Cited

U.S. PATENT DOCUMENTS

| | | | |
|---|---|---|---|
| Re. 32,451 | 7/1987 | Proctor et al. | 62/149 |
| Re. 33,212 | 5/1990 | Lower et al. | 62/126 |
| 1,938,205 | 12/1933 | Yeomans | 62/98 |
| 2,044,096 | 6/1936 | Moran | 210/150 |
| 2,321,964 | 6/1943 | Zieber | 62/115 |
| 2,341,429 | 2/1944 | Elsey | 62/170 |
| 2,341,430 | 2/1944 | Elsey | 62/170 |
| 2,511,967 | 6/1950 | Campbell | 183/83 |
| 2,577,598 | 12/1951 | Zwickl | 62/117.85 |
| 2,590,061 | 3/1952 | Ash | 62/7 |
| 2,865,442 | 12/1958 | Halford et al. | 158/36.3 |
| 2,917,110 | 12/1959 | Brohl | 158/36 |
| 2,972,235 | 2/1961 | Smith | 62/84 |
| 2,986,894 | 6/1961 | Endress et al. | 62/85 |
| 3,070,977 | 1/1963 | Kimmel et al. | 62/473 |
| 3,131,548 | 5/1964 | Chubb et al. | 62/150 |
| 3,177,680 | 4/1965 | Rasovich et al. | 62/471 |
| 3,232,070 | 2/1966 | Sparano | 62/149 |
| 3,357,197 | 12/1967 | Massengale | 62/77 |
| 3,478,529 | 11/1969 | Boykin | 62/85 |
| 3,729,949 | 5/1973 | Talbot | 62/149 |
| 3,811,291 | 5/1974 | Schibbye | 62/84 |
| 3,872,687 | 3/1975 | Bottum et al. | 62/243 |
| 3,874,192 | 4/1975 | Kato | 62/473 |
| 3,915,857 | 10/1975 | Olson | 210/62 |
| 3,978,685 | 9/1976 | Taylor | 62/471 |
| 4,110,998 | 9/1978 | Owen | 62/125 |
| 4,180,986 | 1/1980 | Shaw | 62/192 |
| 4,236,381 | 12/1980 | Imral et al. | 62/324 R |
| 4,261,178 | 4/1981 | Cain | 62/149 |
| 4,285,206 | 8/1981 | Koser | 62/126 |
| 4,304,102 | 12/1981 | Gray | 62/195 |
| 4,363,222 | 12/1982 | Cain | 62/292 |
| 4,364,236 | 12/1982 | Lower et al. | 62/77 |
| 4,441,330 | 4/1984 | Lower et al. | 62/149 |
| 4,456,149 | 6/1984 | Sciortino | 222/1 |
| 4,470,265 | 9/1984 | Correia | 62/77 |
| 4,476,688 | 10/1984 | Goddard | 62/149 |
| 4,480,446 | 11/1984 | Margulefsky et al. | 62/474 |
| 4,513,578 | 4/1985 | Proctor et al. | 62/149 |
| 4,523,897 | 6/1985 | Lower et al. | 417/233 |
| 4,539,817 | 9/1985 | Staggs et al. | 62/149 |

(List continued on next page.)

FOREIGN PATENT DOCUMENTS

| | | |
|---|---|---|
| 0071062 | 9/1983 | European Pat. Off. . |
| 0313079 A2 | 4/1989 | European Pat. Off. . |
| 2056646 | 3/1981 | United Kingdom . |

*Primary Examiner*—John M. Sollecito
*Attorney, Agent, or Firm*—Brinks Hofer Gilson & Lione

[57] ABSTRACT

A method and apparatus for determining refrigerant density and mass flow rate, and for pressurizing a refrigerant recovery tank while the refrigeration system is being recharged. The mass of a flowing refrigerant is automatically continually determined by reliable static means in a controlled recharging process. Flow-dependent pressure, such as the pressure drop across the orifice, and temperature data are taken from the recharging system and are connected to a data processor which uses the pressure and temperature data to determine the refrigerant density and the mass of the flowing refrigerant that has been used. The pressure of a source of recharging refrigerant can be maintained by withdrawing and heating liquid refrigerant and returning the resulting superheated vapor directly to the source of recharging refrigerant, and recharging operations can proceed during such pressure maintenance.

44 Claims, 2 Drawing Sheets

U.S. PATENT DOCUMENTS

| | | | |
|---|---|---|---|
| 4,554,792 | 11/1985 | Margulefsky et al. | 62/77 |
| 4,614,231 | 9/1986 | Proctor et al. | 165/153 |
| 4,624,112 | 11/1986 | Proctor | 62/149 |
| 4,646,527 | 3/1987 | Taylor | 62/85 |
| 4,688,388 | 8/1987 | Lower et al. | 62/126 |
| 4,755,957 | 7/1988 | White et al. | 364/551 |
| 4,768,347 | 9/1988 | Manz et al. | 62/149 |
| 4,776,733 | 10/1988 | Pettersson | 407/114 |
| 4,798,055 | 1/1989 | Murray et al. | 62/127 |
| 4,809,520 | 3/1989 | Manz et al. | 62/292 |
| 4,862,699 | 9/1989 | Lounis | 62/84 |
| 4,878,356 | 11/1989 | Punches et al. | 62/149 |
| 4,909,042 | 3/1990 | Proctor et al. | 62/149 |
| 4,916,915 | 4/1990 | Flinchbaugh | 62/129 |
| 4,934,390 | 6/1990 | Sapp | 134/22.18 |
| 4,938,031 | 7/1990 | Manz et al. | 62/145 |
| 4,939,905 | 7/1990 | Manz | 62/77 |
| 4,942,741 | 7/1990 | Hancock et al. | 62/292 |
| 5,005,375 | 4/1991 | Manz et al. | 62/292 |
| 5,036,675 | 8/1991 | Anderson, Jr. | 62/85 |
| 5,040,382 | 8/1991 | Abraham | 62/470 |
| 5,042,271 | 8/1991 | Manz | 62/473 |
| 5,161,385 | 11/1992 | Schumacher | 62/127 |
| 5,335,512 | 8/1994 | Hancock et al. | 62/292 |
| 5,353,603 | 10/1994 | Outlaw et al. | 62/149 |

METHOD AND APPARATUS FOR SERVICING AUTOMOTIVE REFRIGERATION SYSTEMS

The present invention relates generally to servicing refrigeration systems, including vehicular air conditioning systems, and more particularly to methods and apparatus for recharging such refrigeration systems with refrigerant and to methods and apparatus for determining refrigerant density and refrigerant mass used in recharging such refrigeration systems.

BACKGROUND OF THE INVENTION

It is estimated that more than 85 million passenger cars currently on the road in the United States are equipped with air conditioning systems. In addition, trucks, vans, motor homes and other vehicles are air conditioned, and many trucks and trailers have refrigeration systems for refrigerated food stuffs and other goods. This large number of vehicles represents a wide variety of mechanical refrigeration systems. Those familiar with mechanical refrigeration systems recognize that such vehicular refrigeration systems require servicing periodically. Typically, servicing requires the addition of refrigerant to replace refrigerant which has escaped from the system. Before adding refrigerant, it is often necessary to evacuate the refrigerant remaining in the system, which in the past meant bleeding the refrigerant off into the atmosphere.

In recent years, however, concern has risen regarding the practice of releasing fluorocarbon-based refrigerants into the atmosphere. It is believed that releasing fluorocarbon-based refrigerants into the atmosphere adversely impacts the environment and human health.

To avoid releasing fluorocarbons into the atmosphere, refrigeration servicing apparatus have been constructed that are designed to recover the refrigerant from refrigeration systems. Such servicing apparatus often include means for processing the recovered refrigerant so that the refrigerant can be recycled.

Typically, these systems include a compressor, a condenser, a recovery tank, and various filters and valves to control the flow of refrigerant. Such servicing apparatus frequently present restrictions in the flow path of the refrigerant that may lead to flowing liquid refrigerant to change to a gaseous state. Prior art systems have also included constant flow valves for direct mass-flow measurement or load cells or other weight-determining devices for determining the mass of refrigerant being recharged into the refrigeration system. A major disadvantage of prior art systems is that the constant flow valves include moving parts whose reliable operation can be adversely effected by contaminants in the refrigerant. Another disadvantage is that load cells or other weight-determining devices are typically subject to inaccuracies due to extraneous loadings introduced by permanently connected piping, frost and wind.

Prior to recharging a refrigeration system, it is necessary to ensure adequate refrigerant vapor pressure in the recovery tank. In conventional recharging systems, the vapor pressure is increased by a heating blanket or by recirculating the refrigerant through the entire system to increase the pressure of the refrigerant tank. In the latter case, the refrigerant is taken from the recovery tank and pumped through the system to an evaporator, which adds heat to the refrigerant, then to the compressor and condenser and back to the recovery tank. The refrigerant is continually recirculated until the pressure in the recovery tank is adequate.

A major drawback of such conventional systems is that the recirculating process must be stopped while recharging the refrigeration system. In addition, the time required to raise the tank pressure during recirculation is extended by flowing through the condenser, and the amount of superheat is also reduced because heat is removed from the refrigerant as it passes through the condenser.

SUMMARY OF THE INVENTION

The invention provides novel systems for servicing and recharging refrigeration systems that are less expensive and more reliable than older, prior art systems. The invention provides a method and apparatus for determining refrigerant density and mass flow rate, and for pressurizing a refrigerant source while the refrigeration system is being recharged therefrom, and eliminates the need for a constant flow valve and its moving parts and eliminates load cells or weight-determining devices as well as visual indicators as used in prior art systems.

In the present invention, the mass of a flowing refrigerant is automatically continually determined by reliable static means in a controlled recharging process. Flow-dependent pressure and temperature data are taken from the recharging system and are connected to a data processor which uses the pressure and temperature data to determine the mass of the flowing refrigerant that has been used. The processor determines the density of the flowing refrigerant by using a look-up table of refrigerant density as a function of temperature. Using the pressure, temperature and density data, the processor can calculate the volume flow rate, and the mass flow rate of refrigerant being used in the recharging process. The processor totalizes the refrigerant mass flowing during recharging until a preselected total mass has been used. At that point, the processor can shut down the recharging system or alert an operator to take appropriate action. The invention also includes the use of pressure and temperature data to determine if refrigerant in gaseous phase is being used in recharging and permits adjustment of the density accordingly.

In preferred apparatus of the invention, a fixed orifice is placed in a conduit connecting a source of refrigerant and the refrigeration system to be recharged. Pressure sensors are located on either side of the orifice. A temperature sensor is located between the refrigerant source and the orifice to determine the temperature of refrigerant being used in recharging the refrigeration system. The processor uses the signals from the pressure sensors to determine the pressure drop across the orifice and uses the temperature data to determine the refrigerant density from a first look-up table. The saturation pressure of the recharging refrigerant is determined from a second look-up table to determine if refrigerant is reaching the orifice in a gaseous phase. If the sum of the saturation pressure plus the pressure drop in the refrigerant flow path between the refrigerant source and orifice is less than the refrigerant source pressure, the system will adjust the calculation of refrigerant mass by reducing the density data to reflect presence of gaseous refrigerant.

The present invention thus provides an apparatus for controlling the mass of refrigerant used in recharging refrigeration systems including an orifice, means for determining the mass flow rate of refrigerant through the orifice, and for controlling therefrom the refrigerant mass used in recharging the refrigeration system. The invention further comprises means for determining the volume flow rate of refrigerant and means for determining the density of refrigerant. The means for determining the density includes a temperature sensor disposed between a source of refrigerant and the orifice and a look-up table of density as a function of temperature.

The present invention further includes a method of determining the mass of refrigerant used in recharging a refrigeration system. The method comprises the steps of providing a source of refrigerant, providing conduit means for directing the refrigerant from the source to the refrigeration system, determining the temperature of refrigerant in the conduit means, determining a flow-dependent pressure in said conduit and determining the mass of refrigerant that has flowed through said conduit with said temperature and pressure. The method further includes the steps of providing an orifice in the conduit means and determining a pressure difference across the orifice, and using a data processor for receiving pressure difference data and refrigerant temperature data for determining mass flow rate. The mass flow determining step includes the step of looking up the density of the refrigerant in a look-up table of refrigerant density as a function of temperature and calculating the mass flow of refrigerant through the orifice based on the pressure difference and density.

The invention further provides a method for determining refrigerant density in a conduit of a refrigeration servicing system by using a temperature sensor to generate a temperate signal indicative of the temperature of a refrigerant in the conduit and using the temperature signal to determine the density of the refrigerant, and includes the further steps of using a pressure sensor to generate a pressure signal indicative a pressure of the refrigerant at one site in the conduit, and also using the temperature signal and pressure signal to determine if refrigerant in gaseous phase is present at said one site, and if refrigerant in the gaseous phase is present, adjusting refrigerant density calculations in the servicing system accordingly.

The present invention also provides a novel system for maintaining pressure in a refrigerant recovery tank while simultaneously recharging a refrigerant system from the tank. The invention provides an improved method and apparatus for heating refrigerant during the recharging process and pumping the heated refrigerant to the vapor side of the recovery tank, thus, maintaining pressure in the recovery tank while recharging the refrigeration system.

In the invention, apparatus for heating refrigerant in a refrigeration recharging system can comprise a compressor, a condenser, and a recovery tank having a liquid connection and a vapor connection, and a refrigerant flow path including the compressor and the recovery tank for heating the refrigerant, one aspect of the invention being a bypass conduit for bypassing the condenser so refrigerant can be withdrawn by the compressor from the recovery tank, heated and returned to the vapor side of the recovery tank.

In a further aspect of this invention, a heating means is charged with a mass of liquid refrigerant. The massed liquid refrigerant is heated, and the compressor draws superheated refrigerant vapor from the heating means and pumps the vapor to the vapor side of the recovery tank through a conduit bypassing the condenser. The heating means can comprise a filter/dryer with a filter/dryer inlet valve including a closed position for preventing refrigerant from entering the filter/dryer during recharging.

The invention provides a method for pressurizing a recovery tank which includes the steps of: providing a mass of liquid refrigerant, heating the mass of liquid refrigerant and providing heated refrigerant vapor, and drawing heated vapor from the liquid refrigerant and pumping the heated vapor directly to the vapor side of the recovery tank. The method further includes the step of recharging the refrigeration system, while the drawing step and pumping step occur during the recharging step. The providing step can include the step of charging a predetermined mass of liquid refrigerant into a heating means and the drawing step can include the step of using a compressor to draw the vapor from the heating means.

In addition to the various aspects of the invention summarized above, additional objects, features, and advantages of the invention will become apparent to those skilled in the art upon consideration of the following more detailed description and drawing of a preferred embodiment exemplifying the best mode of carrying out the invention as presently perceived.

DETAILED DESCRIPTION OF THE DRAWINGS

Figure 1:
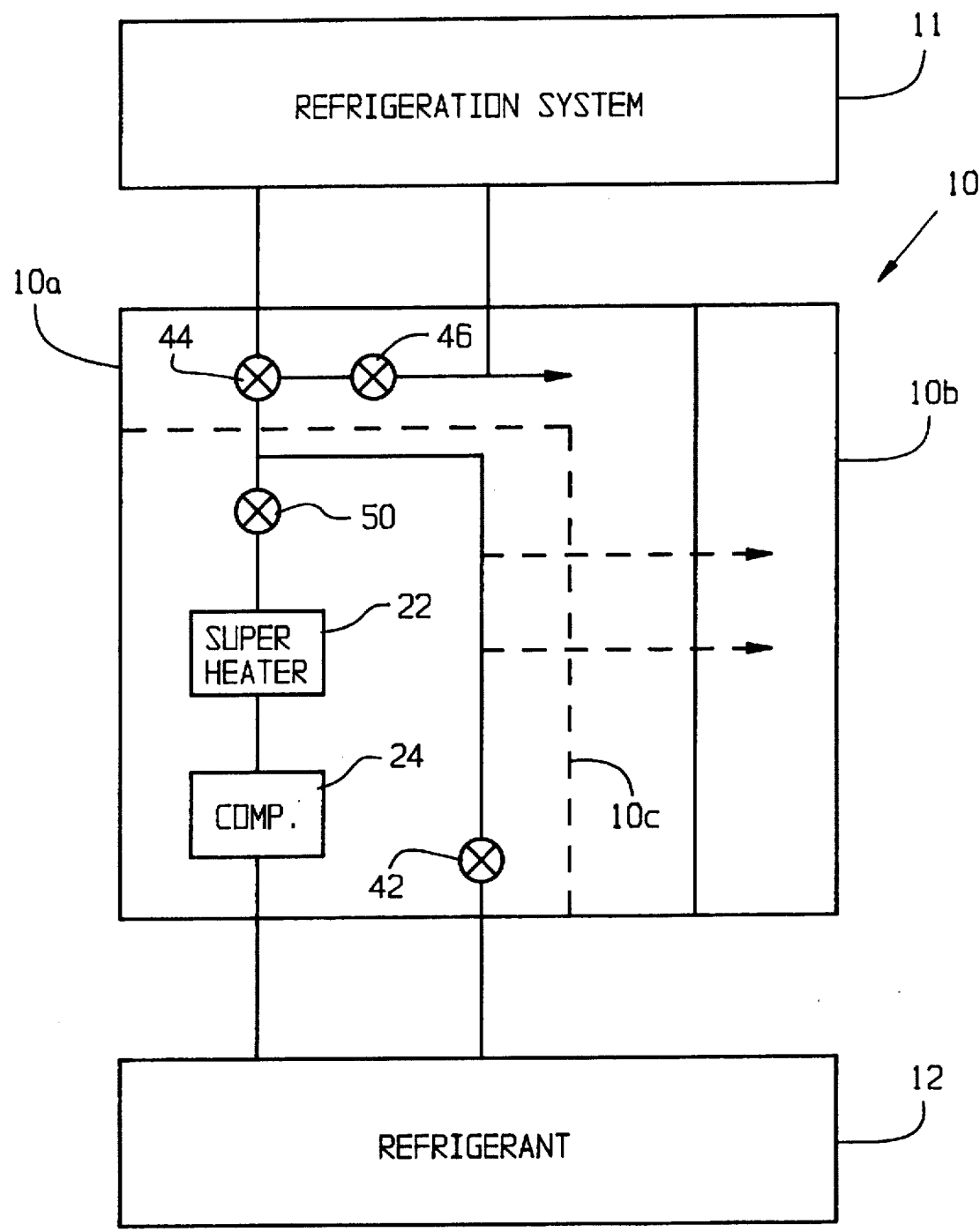
FIG. 1 is a block diagram of one embodiment of the invention.

FIG. 1 is a simplified block diagram of the invention. As shown in FIG. 1, a refrigeration servicing system 10 is connectable with a refrigeration system 11 and with means for receiving and dispensing refrigerant 12, which can comprise a pressurized source of refrigerant for recharging the refrigeration system 11. The refrigeration servicing system 10 comprises means 10a for transferring refrigerant between the refrigeration system 11 and refrigerant receiving and dispensing means 12, and means 10b for controlling the transferring means 10a. With the control means 10b, means 10a can evacuate the refrigeration system 11, recovering its refrigerant in means 12, and can recharge the refrigeration system with an accurate mass of refrigerant. In the invention, control means 10b receives signals with temperature and flow dependent pressure data from sensors connected with transfer means 10a. Control means 10b uses the temperature and pressure data to determine the volume and mass flow rates of refrigerant in transfer means 10a and can totalize the mass flow rate with time to determine a mass of refrigerant that has flowed in the system.

Control means 10b includes inputs that permit a systems user to select modes of operation, such as a refrigeration system "purge" mode (in which refrigerant is transferred from the refrigeration system 11 to receiving-dispensing means 12) and a refrigeration system "charge" mode (in which the refrigeration system is refilled with refrigerant). The inputs also permit the operation to select and predetermine masses of refrigerant to be transferred by the transfer means 10a. As those skilled in the art will recognize, other user inputs may be provided for operation of servicing refrigeration systems.

As well known in fluid mechanics, an orifice can be used to measure volume flow rates of fluids. (See, for example, *Fluid Mechanics*, Second Edition, by R.C. Binder, Prentice Hall, Inc., 1949, pp. 129–130). Volume and mass flow rates can be determined from the area of the orifice, the pressure drop across the orifice, the specific weight or density of the fluid, and flow coefficients that can be determined empirically. Basically, higher pressure differentials across the orifice and higher fluid densities indicate higher mass flow rates.

In preferred systems of the invention, the transfer means 10a can be provided with an orifice 16 for the generation of the flow-dependent pressure data, and control means 10b can be provided with pressure sensors 18, 20 connected to the transfer means 10a upstream and downstream of orifice 16, and with a temperature sensor 14 connected to the transfer means 10a upstream of orifice 16. Control means 10b can include a data processor 13 connected with the pressure and temperature sensors 14, 16, 18 and including memory with two look-up tables 13a, 13b, one table 13a of refrigerant density as a function of temperature and a second table 13b of refrigerant saturation pressure as a function temperature. Data on the pressure drop in transfer means 10a between the pressurized source of refrigerant 12 and the orifice 16 can also be included in control means 10b. As explained in greater detail below, control means 10b can function as means for determining the volume and mass rates of flow of refrigerant and means for determining the density of refrigerant at the site of the orifice 16, whether entirely or partially in liquid state.

As also indicated in FIG. 1 and described in greater detail below, the transfer means 10a can further comprise means 10c for pressurizing and maintaining pressure in the pressurized source of refrigerant 12, and the control means 10b can control the pressure maintaining means 10c by operating the transfer means 10a to remove refrigerant from pressurized source 12, to direct the refrigerant through a heating means 22 in transfer means 10a, and to return heated refrigerant vapor directly to the pressurized source to pressurize and maintain the pressure of pressurized source 12. With systems of the invention, refrigeration systems 11 can be recharged while the system 10a is operating to maintain the source pressure, and the control means 10b an operate the pressure maintaining means 10c whenever the source pressure drops to unacceptable levels and operate transfer means 10a to recharge a refrigeration system when the source pressure is at an acceptable pressure.

Figure 2:
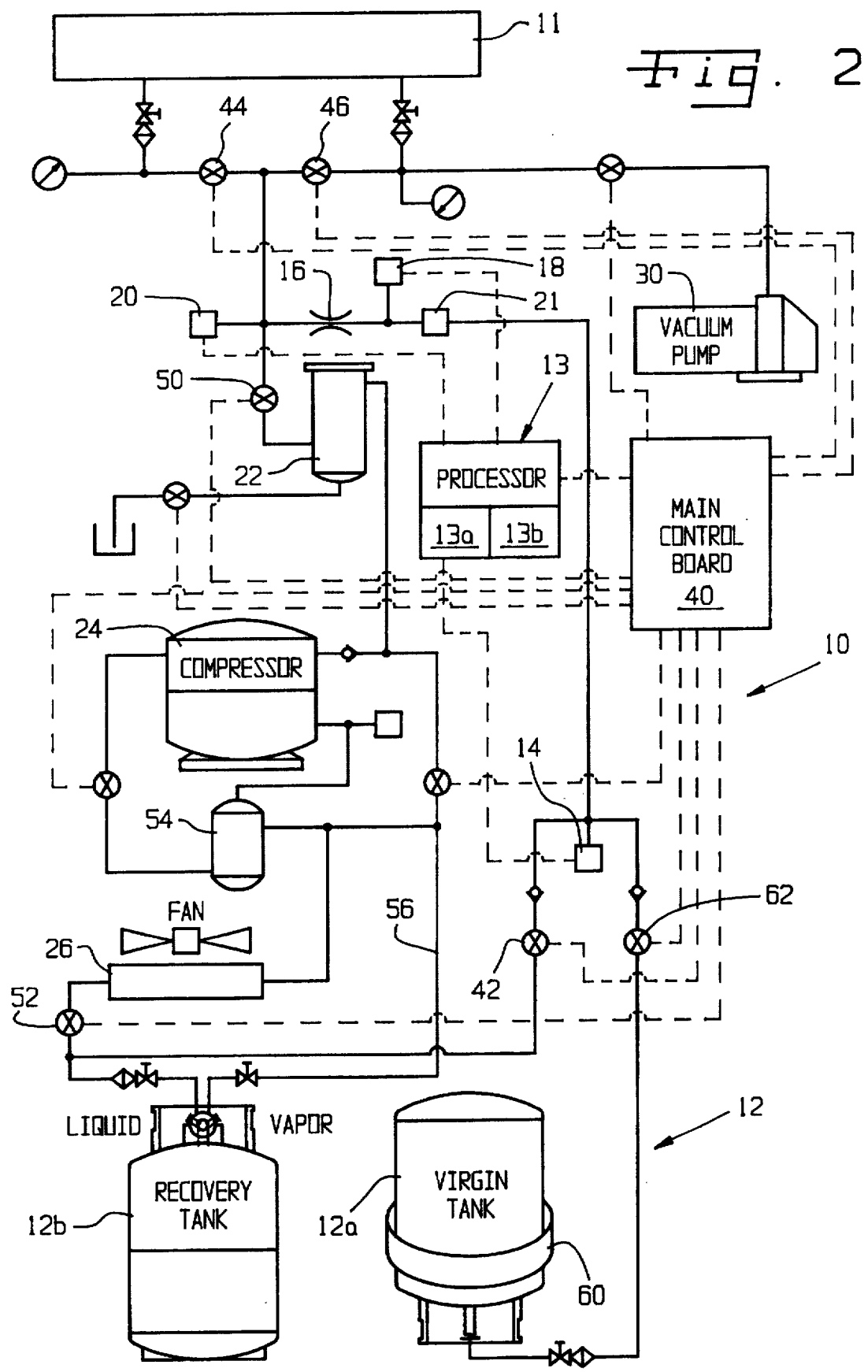
FIG. 2 schematically illustrates a refrigerant recharging system of FIG. 1 according to the present invention.

FIG. 2 illustrates one preferred refrigeration servicing means 10 of the invention for connecting refrigeration system 11, such as an automotive air conditioning system, with a source of refrigerant 12, including a data processor 13 for controlling said transferring means 10a and for accurately and reliably recharging said refrigeration system 11 with selectable mass of refrigerant. The preferred system 10 includes a tank 12a providing a virgin source of refrigerant, a processor 13, a temperature sensor 14, an orifice 16, and a pair of pressure sensors 18, 20 located on the input and output side of the orifice 16, respectively. The preferred system 10 can further include a filter/dryer (or other heating means) 22, compressor 24, condenser 26, and recovery tank 12b. A plurality of conduits connect the various components as shown in FIG. 2, and a plurality of controllable valves, switches, and gauges can control and monitor the flow of refrigerant through the conduits between the various components. The electrical connections between processor 13 and the various controllable valves have been shown in dashed lines and, in some cases, omitted from FIG. 2 to simplify FIG. 2

In the invention, system 10 provides with means for determining accurately the mass flow rate of refrigerant to the refrigeration system 11. The means for determining the mass flow rate includes orifice 16, pressure sensors 18, 20, and temperature sensor 14. The signal outputs of pressure sensors 18, 20 and temperature sensor 14 are electrically connected to a processor 13. The pressure sensors 18, 20 provide flow-dependent refrigerant pressure data related to the change of refrigerant pressure across the orifice 16, and the temperature sensor 14 provides refrigerant temperature data.

The processor 13 takes the inputs from the pressure sensors 18, 20 and the temperature sensor 14 and uses the inputs to calculate the mass flow rate. In particular, the processor 13 uses the temperature input to enter a look-up table 13a of data on refrigerant density as a function of temperature to determine the density of refrigerant being used to recharge the refrigeration system 11. The processor 13 also uses the inputs from pressure sensors 18, 20 to determine the volume flow rate of refrigerant through the orifice 16, and calculates the mass flow rate from the density and volume flow rate. The processor 13 samples the pressure and temperature inputs and calculates the mass flow rate several times a second (e.g., every 0.2 seconds) and totalizes the calculated mass flow. When the totalized mass flow equals a preselected recharging mass of refrigerant, which can be selected by the system user, the processor 13 stops recharging the refrigeration system 11.

One advantage of calculating the mass flow rate as in the present invention is the elimination of the scales, weight-determining devices, and constant flow valves that have been typically used in prior art systems to determine the amount of refrigerant being charged into a refrigeration system. While prior art weight determining devices and constant flow valves have been generally adequate, the present invention offers a less expensive system with increased accuracy and improved reliability over prior art systems. For example, with the present invention, an operator can preselect a desired mass of refrigerant for recharging a particular refrigeration system 11. The processor 13 can be connected to control the operation of one or more electrically operated valves (e.g., valve 60), either directly or through a main control board 40, and can control the operation of those valves so as to stop recharging when the totalized mass of refrigerant, as calculated by the controller 13, equals the desired mass preselected by an operator. Since the calculated mass is unaffected by extraneous loadings, such as frost, wind and permanently connected lines attached to the source of refrigerant 12, the present system 10 can achieve increased accuracy. Also, the pressure sensors, 18, 20, orifice 16 and temperature sensor 14 are less affected by contamination in the refrigerant, whereas such contamination can pose a reliability and maintenance problem for prior art constant flow valves.

A preferred orifice 16 is a 0.028 inch diameter sapphire produced by Bird Precision, Waltham, Mass. The 0.028 inch orifice size is small enough to give a sufficiently large pressure drop (minimum 20 psi) when charging a normal (1.5 to 4.0 pound) automotive A/C system, and it is large enough so it is not easily restricted by debris in the refrigerant flow stream that is not filtered out by a 15 micron filter 21 upstream of the orifice 16. A sapphire orifice is desirable because of the high degree of precision that can be achieved in the orifice size. The close tolerances available with the sapphire (plus or minus 0.0002 inch) are directly related to the accuracy achieved in predicting the flow rate.

The pressure sensors 18, 20 are preferably 0–5 volt analog transducers of the type manufactured by Integrated Sensor Solutions, Inc., as Model XKP-9056219, and are disposed on the input side and output side, respectively, of the orifice 16. The transducers are preferably scaled to produce one psi per one digital count in an analog-to-digital converter.

The temperature sensor 14 is preferably a 10 k ohm, plus or minus 2 percent at 25° C., thermistor similar to that manufactured by Thermodisc, Inc. as Model No. P1H103. The temperature sensor 14 is disposed between the source of refrigerant 12 and the orifice 16 and is positioned directly in the refrigerant flow stream. Placing the temperature sensor 14 in the refrigerant flow stream creates a very low thermal mass in the temperature sensing element to give fast response to the flowing refrigerant. The sensor 14 is preferably located near the source of refrigerant 12, for example, upstream of the outlets of the virgin and recycled refrigerant charge valves 60, 42. Such placement avoids errors in refrigerant temperature that may be due to heat added to the refrigerant by the coils of the solenoid valves 60, 42 and provides faster response time at the start of a charge measurement.

Processor 13 includes a data processor, preferably a microprocessor, such as a Motorola Model No. MC68HC705P6. The processor 13 also includes a data memory with a look-up table 13a of refrigerant density as a function of temperature. The look-up table can be maintained on a floppy disk, a hard disk or a CD-ROM or the like. The processor 13 can also be electrically connected with AC drivers on a main control board 40 that are operated by the processor 13 for opening and closing valves and actuating the compressor 24.

In servicing an automotive refrigeration system, a serviceman can select the system recovery mode of operation and the main control board 40 can operate valves 44, 46, 50 and 52 and compressor 24 to transfer refrigerant from the automotive refrigeration system 11 to recovery tank 12b.

In operation, the recovery tank 12b is pressurized before recharging the refrigeration system 11 through means 10c for maintaining pressure in the source of refrigerant 12. To accomplish pressurization, the transfer means 10a is provided with a refrigerant flow path including the compressor 24, the source of refrigerant 12 (i.e., the recovery tank 12b) and a heating means, such as filter/dryer 22.

In operation of the system 10 by the control means 10b, the recycle charge valve 42 is opened, the high side and low side valves 44, 46 leading to the refrigeration system 11 are closed, the filter/dryer inlet valve 50 is opened, and the liquid valve 52 at the output of the condenser 24 is closed. Refrigerant is sent from the liquid side of the recovery tank 12b through the orifice 16, where the refrigerant mass flowing through the orifice 16 to the filter/dryer 22 is determined as previously described. In the filter/dryer 22 liquid refrigerant is vaporized by the addition of heat. For example, when the processor 13 calculates that 12 ounces have been charged into the filter/dryer 22, the recycle charge valve 42 and filter/dryer inlet valve 50 are closed and the compressor 24 is turned ON. The compressor 24 draws off vapor from the refrigerant in the filter/dryer 22 and pumps the vapor through a compressor oil separator 54. Since the liquid valve 52 is closed, the vapor from the filter/dryer 22 bypasses the condenser 26 and is routed through a bypass conduit 56 directly into the vapor side of the recovery tank 12b. The filter/dryer 22 thus comprises heating means for the withdrawn refrigerant. Liquid refrigerant from recovery tank 12b is thus superheated and returned directly to the recovery tank 12b to pressurize the recovery tank 12b.

At periodic intervals during the recharging process, the processor 13 samples the pressure in the recovery tank 12b by momentarily opening the recycle charge valve 42 to expose pressure sensor 18 to recovery tank pressure. When the recovery tank vapor pressure has been increased 10 psi above the first sampling pressure, the processor 13 opens the recycle charge valve 42 and the high side and low side valves 44, 46, allowing liquid refrigerant to flow into the refrigeration system 11. The filter/dryer inlet valve 50 remains closed while the recovery tank pressure is acceptably high enough for recharging the refrigeration system 11.

The processor 13 continuously calculates and totalizes the mass of refrigerant passing through the orifice 16 and compares the totalized mass against a desired mass of refrigerant preselected by the operator. When the totalized mass equals the desired mass, the controller 13 closes the recycle charge valve 42 and the high side and low side valves 44, 46.

Unlike conventional systems, this means for pressurizing and maintaining pressure in the source of refrigerant 12b of the present invention advantageously increases the vapor pressure in the recovery tank 12b without the use of heating blankets, and maintains a satisfactory vapor pressure in the recovery tank 12b during the recharging process. That is, experience teaches that it takes about 5 minutes to completely draw down the refrigerant vapor from the 12 ounces of refrigerant initially loaded into the filter/dryer 22, while it only takes about 1 to 2 minutes to superheat the refrigerant vapor to reach the 10 psi vapor pressure increase in the recovery tank 12b. Thus, the system 10 is ready to recharge the refrigerant system 11 from the recovery tank 12b before all of the refrigerant vapor has been removed from the filter/dryer 22. The present system advantageously allows for continued superheating of the refrigerant vapor simultaneously with the recharging of the refrigeration system 11, thereby maintaining an acceptable vapor pressure in the recovery tank 12b. In conventional systems, on the other hand, the pressure in the recovery tank will increase very slowly, requiring possibly 30 minutes to reach a pressure sufficient for charging, and decreases as liquid refrigerant is used to recharge the refrigeration system because the superheating process must be discontinued in order to recharge the refrigeration system.

The preferred system 10 also allows for recharging a refrigeration system 11 from a tank 12a of virgin refrigerant. When refrigerant is taken from the virgin tank 12a of the preferred system, a conventional heating blanket 60 raises the vapor pressure in the tank 12a. Virgin charge valve 62 is periodically opened momentarily so the virgin tank pressure can be sensed by pressure sensor 18. When the desired tank pressure is achieved, the virgin charge valve 62 and the high side and low side valves 44, 46 are opened and the refrigerant is allowed to recharge the refrigeration system 11. Of course, when a virgin tank 12a is used, the recycle charge valve 42 remains closed. When the processor 13 determines that the desired mass of refrigerant has passed through the orifice 16, it closes the virgin charge valve 60 and the high side and low side valves 44, 46.

According to another feature of the present invention, the processor 13 also uses the pressure and temperature data to determine the presence of gaseous refrigerant at the orifice 16 and adjusts the refrigerant density data accordingly. This feature permits the accommodation of restrictions in the refrigerant flow path with little loss of accuracy in the determination of the mass of refrigerant used in recharging. Processor 13 can be provided with a second look-up table 13b of refrigerant saturation pressure as a function of refrigerant temperature and of conduit pressure drop as a function of refrigerant flow rate. The processor 13 compares the orifice input pressure from pressure sensor 18 with the sum of the refrigerant saturation pressure and pressure drop in the conduit connecting the source 12 and the orifice 16 to determine the presence of gaseous refrigerant at the orifice input. Gaseous refrigerant will be present at the orifice input if the sum of the saturation pressure, as determined from look-up table 13b of refrigerant saturation pressure vs. temperature (measured by temperature sensor 14), plus the pressure drop in the conduit connecting the source of refrigerant 12 (tanks 12a, 12b) and the orifice 16 is less than the tank pressure as measured by the pressure sensor 18. That is, if the pressure in the conduit upstream of the orifice 16 drops below the saturation pressure at the temperature of the refrigerant, the refrigerant begins changing into a gas. The look-up tables 13b can also be stored in data storage means, such as a CD-ROM, connected to the microprocessor. If the processor 13 determines that gaseous refrigerant is present at the input of orifice 16, the processor 13 reduces the density value used to calculate the mass flow rate to reflect the decreased density. The data for density reduction can also be stored in look-up table 13b.

The invention thus provides means for servicing automotive refrigeration systems which is less expensive, more reliable and more accurate in recharging the refrigeration system than the prior art systems.

Although the invention has been described in detail with reference to a certain preferred embodiment, variations and modifications exist within the scope and spirit of the invention as described and defined in the following claims.

I claim:

1. Apparatus for servicing an automotive refrigeration system, compromising,
    a pressurized source of refrigerant;
    means for transferring refrigerant between said automotive refrigeration system and said pressurized source of refrigerant,
    means for controlling said refrigerant transferring means to refill the automotive refrigeration system with a selected mass of refrigerant,
    said transferring means including a fixed orifice through which refrigerant is directed in refilling the automotive refrigeration system,
    said control means including pressure sensor means for sensing refrigerant pressures upstream and downstream of said fixed orifice, temperature sensor means for sensing the temperature of the refrigerant upstream of the fixed orifice, means for determining from said refrigerant temperature and from the refrigerant pressures upstream and downstream of the fixed orifice the mass flow rate of the refrigerant being transferred in refilling, and for controlling the refrigerant flow to refill the automotive refrigerant system with a preselected mass of refrigerant.

2. The apparatus of claim 1 wherein said controlling means comprises a microprocessor connected with said pressure sensors and said temperature sensor and a look up table of refrigerant density as a function of temperature, said microprocessor calculating refrigerant mass flow rate from said volume flow rate and said refrigerant density and totalizing refrigerant mass until the preselected total mass has passed said orifice, and providing an output to close one or more valves controlling refrigerant flow.

3. The apparatus of claim 2 wherein said microprocessor further includes a second look up table of refrigerant saturation pressure as a function of temperature and determines from said saturation pressure, refrigerant source pressure, and a transfer means pressure drop if refrigerant in gaseous phase is passing through said orifice, said microprocessor adjusting the refrigerant density data used in calculating mass flow rate to compensate for the gaseous refrigerant being used in refilling the automotive refrigeration system.

4. The apparatus of claim 2 wherein said transferring means further comprises means for maintaining pressure in said refrigerant tank during refilling, and wherein said controller controls said pressure maintaining means by directing refrigerant from said recovery tank through said orifice and into a refrigerant heating means until a preselected mass of refrigerant has been delivered to the heating means for vaporization, and directing vaporized refrigerant from said heating means to said refrigerant tank.

5. The apparatus of claim 4 wherein said controller samples the upstream orifice pressure and controls said transferring means to refill said automotive refrigeration system when said upstream pressure is at an acceptable level.

6. The apparatus of claim 1 wherein said means for determining from said refrigerant temperature and from the refrigerant pressures upstream and downstream of said fixed orifice the mass flow rate of the refrigerant being transferred in refilling and controlling the refrigerant flow to refill the automotive refrigerant system with preselected mass of refrigerant comprises:
    means for determining the density of refrigerant;
    means for determining the volume flow rate of refrigerant; and
    a processor for determining the mass flow rate of refrigerant based on the volume flow rate and density of the refrigerant.

7. The apparatus of claim 6 wherein the means for sensing refrigerant pressures upstream and downstream of said fixed orifice comprises first and second pressure sensors, the first pressure sensor being disposed on the input side of the fixed orifice and the second pressure sensor being disposed on the output side of the fixed orifice.

8. The apparatus of claim 7 wherein the processor receives pressure signals from the first and second pressure sensors and calculates the volume flow rate of refrigerant with the pressure signals.

9. The apparatus of claim 7 wherein the means for determining the density of refrigerant includes a temperature sensor disposed between the source of refrigerant and the orifice.

10. The apparatus of claim 7 wherein the processor receives a temperature signal from the temperature sensor means and determines the density of the refrigerant from a look-up table of density as a function of temperature.

11. Apparatus for metering the flow of refrigerant in recharging refrigeration systems, the apparatus comprising:
    means for determining a flow related refrigerant pressure;
    means for determining a refrigerant temperature;
    means for determining the mass flow rate of refrigerant from said refrigerant pressure and temperature;
    means for inputting a desired mass of refrigerant to be used in recharging; and
    a processor for controlling the flow of refrigerant based on the mass flow rate and the desired mass of refrigerant.

12. The apparatus of claim 11 wherein the means for determining a flow related pressure comprises an orifice disposed in the flow of refrigerant and a pair of pressure sensors, with one of the pair of pressure sensors being located on each side of the orifice, said pressure sensors determining the pressures of the refrigerant on both sides of the orifice.

13. The apparatus of claim 12 wherein the means for determining refrigerant temperature comprises a temperature sensor for determining the temperature of the refrigerant upstream of the orifice and the processor receives a signal from each pressure sensor and the temperature sensor and calculates the mass flow of refrigerant using the received signals.

14. The apparatus of claim 11 wherein said means for determining refrigerant temperature comprises:

a temperature sensor for providing a refrigerant temperature signal; and said processor determines the refrigerant density based on the refrigerant temperature signal.

15. The apparatus of claim 14 wherein the processor includes a look-up table of refrigerant density as a function of temperature.

16. In a system for recharging a refrigeration system, the improvement, comprising:

means for determining the mass of recharging refrigerant based on temperature and pressure inputs taken from the refrigerant recharging system, and a processor for receiving said temperature and pressure inputs and for using said inputs to determine refrigerant density and whether refrigerant in the gaseous phase is present in the mass of recharging refrigerant and, if it is determined that refrigerant in the gaseous phase is present, adjusting refrigerant density in the calculation of refrigerant mass.

17. The refrigerant recharging system of claim 16 further comprising:

a temperature sensor that provides a signal of refrigerant temperature to said processor;

said processor providing a mass flow calculation system using the determined refrigerant density to meter refrigerant in the refrigerant recharging system.

18. The refrigerant recharging system of claim 16 wherein said means for determining the mass of recharging refrigerant includes an orifice through which the recharging refrigerant flows; and said pressure inputs are taken upstream and downstream of said orifice, said temperature is measured upstream of said orifice;

the density of said refrigerant is determined by said processor from said temperature;

and said upstream temperature and pressure are used to determine if refrigerant in gaseous phase is present at said orifice, said processor adjusting the calculation of refrigerant mass by reducing the refrigerant density value.

19. A refrigeration recharging system comprising:

a refrigerant conduit, connectable to a source of refrigerant;

an orifice disposed in the conduit;

a pressure sensor connected with said conduit for providing an orifice input pressure signal;

a temperature sensor connected with said conduit for providing a refrigerant temperature signal from upstream of said orifice; and means for receiving the orifice input pressure signal and the refrigerant temperature signal and determining whether refrigerant in the gaseous phase is being used in recharging.

20. A method of recharging an automotive refrigeration system, the method comprising the steps of:

providing a source of refrigerant;

transferring refrigerant between said source of refrigerant and said automotive refrigeration system.

directing the transferred refrigerant from the source of refrigerant through a conduit means to the automotive refrigeration system to be recharged;

determining the temperature of refrigerant in the conduit means;

determining a flow dependent pressure in said conduit means;

determining the mass of refrigerant that is flowing through said conduit means with said determined temperature and pressure; and controlling the transfer of refrigerant in response to the determined mass of refrigerant.

21. The method of claim 20 wherein the step of determining a flow dependent pressure comprises providing an orifice in the conduit means and determining a pressure difference across the orifice.

22. The method of claim 21 further including using a data processor for receiving pressure difference data and a refrigerant temperature data and for determining therefrom said mass of refrigerant.

23. The method of claim 22 wherein the step of determining said mass of refrigerant further includes the step of looking up the density of the refrigerant in a look-up table of refrigerant density as a function of temperature and calculating the mass of refrigerant that is flowing through the orifice using the pressure difference data and the refrigerant density.

24. The method of claim 20 wherein the step of determining the mass of refrigerant comprises using said temperature to determine refrigerant density and adjusting said refrigerant density for the presence of refrigerant in gaseous phase by using said temperature and pressure.

25. The method of claim 24 further comprising the step of using the flow dependent pressure and temperature for determining the presence of refrigerant in gaseous phase that is flowing through said conduit and adjusting the refrigerant density used in determining the refrigerant mass if refrigerant in gaseous phase is present in said conduit.

26. The apparatus of claim 11 further comprising:

a source of recharging refrigerant; and a conduit for carrying recharging refrigerant to a refrigeration system to be recharged, wherein said means for determining the temperature of the recharging refrigerant comprises temperature sensor for the refrigerant in said conduit; and said processor includes means for determining the density of the recharging refrigerant based on the temperature.

27. The apparatus of claim 26 wherein the density determining means includes a processor-accessed look-up table of refrigerant density as a function of temperature.

28. The apparatus of claim 26 further comprising an orifice disposed in the conduit between the source of recharging refrigerant and the system to be recharged and said means for determining a flow related refrigerant pressure comprises at least one pressure sensor for the pressure difference across the orifice.

29. The apparatus of claim 28 wherein said processor receives a temperature signal from the temperature sensor and a pressure signal indicative of the pressure difference from said pressure sensor, said processor determining the mass flow of refrigerant flowing through the orifice based on the temperature and pressure signals.

30. The apparatus of claim 1 wherein said pressurized source of refrigerant comprises:

a recovery tank having a vapor connection and a liquid connection from which refrigerant is withdrawn for recharging;

and wherein said means for transferring refrigerant between said automotive refrigeration system and said pressurized source of refrigerant comprises:

a compressor;

heating means for adding heat to refrigerant withdrawn from said tank; and conduit means for connecting said liquid connection, said compressor, said heating means and said vapor connection of the recovery tank, said control means operating said compressor to deliver liquid refrigerant from the liquid connection to said heating means and to return heated refrigerant to said vapor connection of said tank.

31. The apparatus of claim 30 wherein the recharging system includes a condenser and the conduit means includes a bypass conduit for bypassing the condenser.

32. In the refrigerant recharging system of claim 17 wherein the recharging system includes a compressor, condenser, and a recovery tank having a liquid connection and a vapor connection, the further improvement comprising:

a refrigerant flow path including said compressor and recovery tank for heating refrigerant, and a bypass conduit for bypassing the condenser so refrigerant can be withdrawn by the compressor from said liquid connection of the recovery tank, heated and returned to the vapor connection of the recovery tank.

33. The improvement of claim 32 further including means for heating refrigerant in said refrigerant flow path, said heating means being charged with a mass of liquid refrigerant, the compressor being coupled to the heating means to draw vapor from the heating means for pressurizing the recovery tank.

34. The improvement of claim 33 further comprising refrigerant control means for allowing simultaneous recharging of a refrigeration system and heating refrigerant in the recovery tank.

35. The method of claim 20 further comprising the steps of:

providing a heating means, charging said heating means with a predetermined mass of liquid refrigerant from said source of refrigerant;

heating said predetermined mass of liquid refrigerant and providing thereby refrigerant vapor;

providing said source of liquid refrigerant with a vapor connection; and drawing refrigerant vapor from the heating means and passing refrigerant vapor to said vapor connection of said source of refrigerant.

36. The method of claim 20 further comprising the steps of:

providing a mass of liquid refrigerant;

heating said mass of liquid refrigerant and providing refrigerant vapor; and drawing vapor from the liquid refrigerant and pumping the vapor to a vapor side of said source of refrigerant.

37. The method of claim 36 wherein the drawing step and pumping step occur during the transferring step.

38. The method of claim 36 wherein the providing step includes the step of charging a predetermined mass of liquid refrigerant into a heating means for heating the liquid refrigerant and the drawing step includes using a compressor to draw vapor from the heating means.

39. The method of claim 38 wherein the recovery tank includes a liquid side and a vapor side and the pumping step includes the step of pumping the vapor directly to the vapor side of the recovery tank while liquid refrigerant is being drawn from the liquid side of the recovery tank to recharge the refrigeration system.

40. The refrigerant recharging system of claim 19 further comprising:

a compressor;

a recovery tank, as said source of refrigerant, having a vapor connection and a liquid connection, said liquid connection being connected with said refrigerant conduit; and means for superheating refrigerant vapor and directing superheated refrigerant vapor to the vapor connection while recharging a refrigeration system from the liquid connection of the recovery tank through said refrigerant conduit.

41. The system of claim 40 wherein the means for superheating refrigerant vapor includes a filter/dryer charged with a mass of liquid refrigerant, the compressor being coupled to the filter/dryer to draw vapor from the filter/dryer.

42. The refrigeration recharging system of claim 19 further comprising:

a tank of recharging refrigerant having a liquid connection and a vapor connection; and means for maintaining vapor pressure in the tank while the recharging system recharges a refrigeration system through said refrigerant conduit by removing liquid refrigerant from the liquid connection of the tank, by adding heat to said removed refrigerant to provide superheated refrigerant vapor, and by returning said superheated refrigerant to said tank.

43. The system of claim 42 wherein the maintaining means includes means for superheating refrigerant vapor comprising a conduit coupled to the vapor side of the tank.

44. The system of claim 43 wherein the superheating means includes a filter/dryer charged with a mass of liquid refrigerant and a compressor for drawing vapor from the liquid refrigerant and directing the vapor to the conduit.

* * * * *